No. 694,679. Patented Mar. 4, 1902.
J. R. SHELDON.
VAPORIZER.
(Application filed May 9, 1900.)
(No Model.)
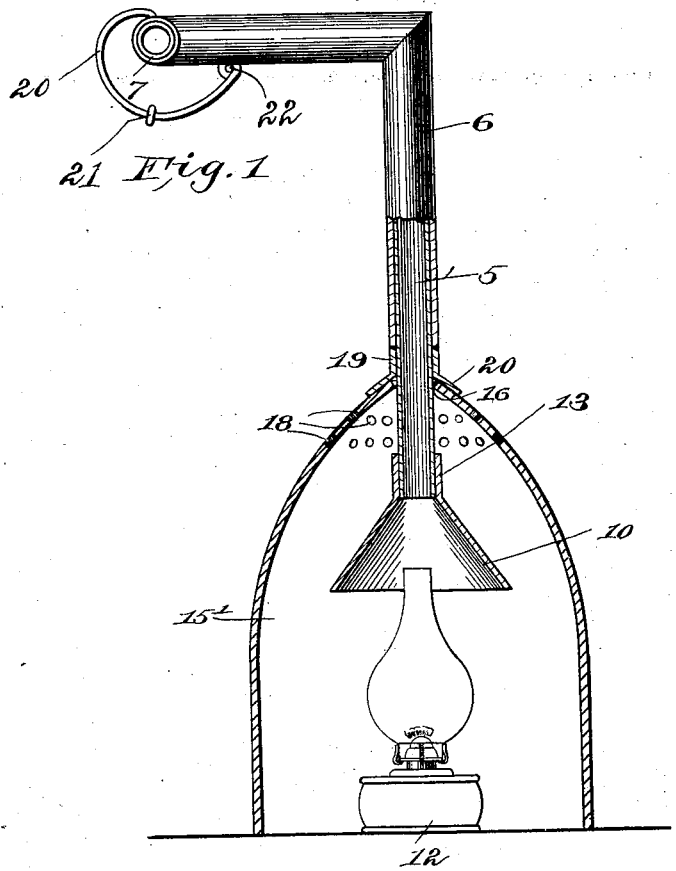
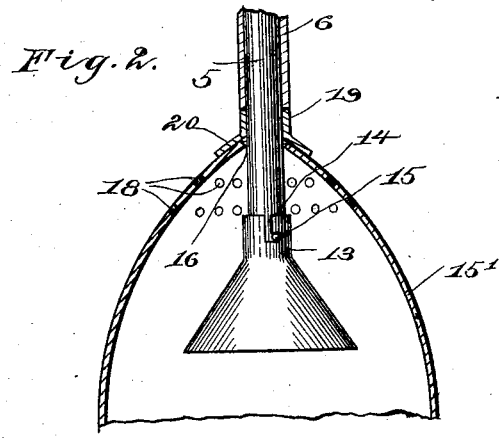
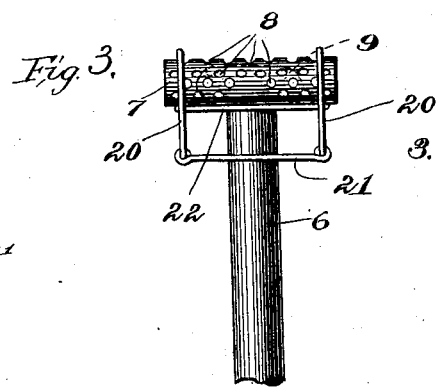
Witnesses.
Adolf C Kaiser
W. C. Lunsford.
Inventor.
John R. Sheldon
by Crosby & Gregory
attys

UNITED STATES PATENT OFFICE.

JOHN R. SHELDON, OF WATERTOWN, MASSACHUSETTS.

VAPORIZER.

SPECIFICATION forming part of Letters Patent No. 694,679, dated March 4, 1902.

Application filed May 9, 1900. Serial No. 16,023. (No model.)

*To all whom it may concern:*

Be it known that I, JOHN R. SHELDON, a citizen of the United States, and a resident of Watertown, county of Middlesex, State of Massachusetts, have invented an Improvement in Vaporizers, of which the following description, in connection with the accompanying drawings, is a specification, like figures on the drawings representing like parts.

This invention relates to vaporizers; and the object of the invention is to provide a portable device of this character capable of securing a high heat to be utilized in vaporizing alcohol or medicated liquid, the resultant heat and vapor being directed against members of the body for the remedial effects thereof.

The device constituting the subject-matter of this application involves in the embodiment thereof illustrated in the accompanying drawings a conduit having a transverse chambered head communicating with the bore of the conduit, the head being adapted to receive an absorbent—such as a sponge, cotton, or lint—saturated with a volatile liquid, and said head has an opening for the discharge of the heated vapors, and the conduit is open at its lower end to receive the heat generated from a suitable medium, which passes up through the pipe and is directed thereby against the absorbent in sufficient quantities to vaporize the liquid. In the present case the lower end of the conduit is flared or bell-shaped in order to receive a relatively large volume of heat.

The heating agent may be of any suitable kind, such as a lamp. I prefer to surround the lamp with a protector, which may be connected with the conduit, and the function of the protector is to save the bed or bedclothing from injury while the vaporizer is being used near the same, very excellent results being obtained by passing the transverse head which contains the volatile liquid between the coverings of a bed.

In the drawings, Figure 1 is a longitudinal central section of the vaporizer. Fig. 2 is a detail of the lower end of the conduit and a portion of the protector, and Fig. 3 is a plan view of a portion of the conduit.

The article includes in its construction a conduit or pipe, as 5, which may be of metal, and it is represented as being of inverted-L shape, this being a convenient form to permit the ready insertion of the horizontal branch thereof, which carries the head between the clothing of a bed. As the conduit radiates considerable heat, I prefer to cover the same with a heat-insulating jacket, as 6, of any suitable material, which serves its usual function.

The horizontal portion of the conduit 5 terminates in a transverse head 7, both ends of the same being shown as open, and which has a plurality of holes or openings as 8. The tubular head 7 is adapted to receive a mass of absorbent material, as shown at 9 in Fig. 3 by dotted lines, such material being soaked in alcohol or medicated liquid, which is adapted to be vaporized by heat passing through the conduit 5, the vapor and heat passing through the holes 8 and the open ends of the head and striking the part of the body to be treated, the device being very useful in rheumatic and other like affections.

The conduit 5 has its lower end flaring or bell-shaped, as at 10, under which a suitable heating medium, as a lamp 12, is placed, the heating medium being of such a nature as to generate dry heat. The flared or bell-shaped portion 10 is provided with a sleeve, as 13, having a bayonet-slot 14 to receive the pin 15, by which said flared or bell-shaped portion can be detachably held in place. The lamp 12 is placed centrally under said bell portion 10, and the dry heat from the same is conducted directly to the chambered head 7 in sufficient quantities to vaporize the liquid therein. It is essential, therefore, that the conduit retain the heat delivered from the heating medium, for should the heat be radiated or dissipated before it reaches the chambered head 7 the liquid in said head would not be vaporized. My invention therefore has for one of its essential features a conduit which is practically heat-insulated and which is adapted to carry sufficient dry heat from the heating medium directly to the liquid in the chambered head. I prefer to surround the lamp with a protector, as 15'. Said protector is usually made of tin and serves to prevent injury to the bed or bedclothing by heat. It is represented as being of dome shape, and the conduit 5 extends through the opening 16 in the apex of said protector. Said protector has near its apex a plurality of ventilating-openings, as 18. A collar, as 19, is slidable upon the vertical portion of the conduit 5, and it has a downturned angular flange, as 20, lapping over and secured to the upper side of the protector. The collar 19 forms, in effect, a part of the protector, and it is slidable upon the conduit 5, by reason of which adjustable connection between the parts the device is adapted for use with beds of different heights. The bell-shaped portion 10 being disconnected from the conduit 5, the latter can be passed through the opening 16, after which the sleeve 13 can be slipped over the lower end of said conduit, and its slot 14 can receive the pin 15, so as to connect the parts.

The head 7 has a guard of suitable kind connected thereto, the purpose of the guard being to permit the bedclothing from coming in contact with said head. The guard is shown consisting of wires, as 20, secured to the upper side of the head and curved around the same, said wires being united by transverse wires, as 21 and 22, the latter being adapted to be secured to the horizontal portion of the conduit 6.

The invention may be modified within the scope of the accompanying claims.

Having described my invention, what I claim as new, and desire to secure by Letters Patent, is—

1. In an apparatus of the class described, a comparatively short conduit open at both ends, a hollow cylindrical head secured to one end thereof and communicating therewith, the ends of said head being open and said head being adapted to receive an absorbent saturated with a volatile liquid, a device for generating dry heat beneath the lower end of said conduit, and a heat-resisting jacket surrounding said conduit, the construction being such that the dry heat from the heating device is conducted through the conduit directly to the head in sufficient quantities to vaporize the liquid therein.

2. In an apparatus of the class described, a chamber adapted to receive an absorbent saturated with a volatile liquid, such chamber having openings for the discharge of vapor and heat, a heating device adapted to generate dry heat, a heat-insulated conduit open at both ends and affording direct communication between the heating medium and the chamber whereby sufficient dry heat from the heating medium is conveyed to the chamber to vaporize the liquid therein combined with a protector adapted to surround the heating device.

3. In an apparatus of the class described, a comparatively short conduit, a heat-resisting covering inclosing said conduit, the said conduit terminating in a chambered head which is adapted to receive an absorbent saturated with a volatile liquid, said head having an opening for the discharge of vapors and heat, the lower end of the conduit being open and flared, and a device for generating dry heat beneath said flared end of the conduit, the short conduit conducting heat from the heating medium directly to the chambered head to thereby vaporize the liquid in the absorbent.

4. In an apparatus of the class described, a conduit terminating in a chambered head, a heat-resisting covering surrounding said conduit, an absorbent saturated with vaporizing liquid contained in said chambered head, the said head having openings therein for the discharge of heat and vapors, the lower end of the conduit being open and flared, a heating medium beneath said lower flared end, and a protector surrounding said heating medium, the heat from the medium being conducted through the conduit in sufficient quantities to vaporize the liquid in the absorbent.

5. In an apparatus of the class described, a comparatively short conduit terminating in a chamber-head, an absorbent saturated with vaporized liquid contained in said head, the said head having openings therein for the discharge of the heat and vapors and the said conduit being open and flared at its lower end, a heating medium beneath said flared open end of the conduit, and a dome-like protector surrounding the heating medium and secured to the conduit by means of a sliding connection, the heat from the heating medium passing up the conduit and vaporizing the liquid in the absorbent.

6. A jacketed conduit having a transverse head communicating with the bore of the conduit, the head being adapted to receive an absorbent saturated with a vaporizing liquid and having a multiplicity of openings for the discharge of vapor and heat, and the lower end of the conduit being flared or bell-shaped, and a dome-like protector slidably connected with the conduit.

7. In a device of the class specified, a conduit having at one end a chambered head communicating with the bore of said conduit and at its other end a flaring mouth to receive the heat from the heating medium, the said chambered head being adapted to receive an absorbent saturated with a vaporizing liquid and having a series of apertures therein for the discharge of vapors and heat, and a guard surrounding the said head.

In testimony whereof I have signed my name to this specification in the presence of two subscribing witnesses.

JOHN R. SHELDON.

Witnesses:
  HEATH SUTHERLAND,
  LOUISE ROTHSTEIN.